US006199252B1

(12) United States Patent
Masters et al.

(10) Patent No.: US 6,199,252 B1
(45) Date of Patent: *Mar. 13, 2001

(54) MODULAR SEAT ASSEMBLY AND METHOD OF INSTALLING THE SAME WITHIN A VEHICLE

(75) Inventors: James C. Masters, Farmington Hills, MI (US); Andrew J. Massara, Vargön (SE); Philip W. Leistra, III, Birmingham, MI (US); Gregory Allison, Orefield, PA (US)

(73) Assignee: Lear Corporation, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,298

(22) Filed: Feb. 20, 1998

Related U.S. Application Data (63) Continuation-in-part of application No. 08/705,512, filed on Aug. 29, 1996, now Pat. No. 5,813,715, and a continuation-in-part of application No. 08/705,513, filed on Aug. 29, 1996, now Pat. No. 6,010,195.
(60) Provisional application No. 60/007,548, filed on Nov. 27, 1995, and provisional application No. 60/016,775, filed on May 7, 1996.

(51) Int. Cl.[7] ............................... B68G 7/00; B23P 21/00
(52) U.S. Cl. ........................... 29/91.1; 29/897.2; 29/469; 29/525.01; 297/218.3; 297/452.55
(58) Field of Search ............................ 29/469, 91, 91.1, 29/401.1, 525.01, 897.2; 297/118, 218.3, 218.5, 451.8, 452.55, 452.2

(56) References Cited

U.S. PATENT DOCUMENTS

| 1,237,956 | 8/1917 | Pue . |
|---|---|---|
| 2,647,791 | 8/1953 | Barenyi . |
| 3,446,526 | 5/1969 | Peters . |
| 3,632,157 | 1/1972 | Lohr . |
| 3,669,498 | 6/1972 | Meyers et al. . |
| 3,702,204 | * 11/1972 | Tipton et al. . |
| 3,727,977 | 4/1973 | Gmeiner . |
| 3,799,577 | 3/1974 | Colucci . |
| 3,861,747 | * 1/1975 | Diamond . |
| 3,896,531 | * 7/1975 | Gorman . |
| 3,983,640 | 10/1976 | Cardullo et al. . |
| 4,036,527 | * 7/1977 | Faul . |
| 4,124,251 | * 11/1978 | Petersen . |

(List continued on next page.)

FOREIGN PATENT DOCUMENTS

| 2605952 | 8/1977 | (DE) . |
|---|---|---|
| 308374 | 3/1989 | (EP) . |
| 2698832 | 6/1994 | (FR) . |
| 0205238 | 12/1982 | (JP) ................................ 297/284.11 |
| 97/19727 | 6/1997 | (WO) . |

Primary Examiner—David P. Bryant
(74) Attorney, Agent, or Firm—MacMillan, Sobanski & Todd, LLC (57) ABSTRACT

A method of installing a front seat assembly in a vehicle interior is disclosed. The front seat assembly has first and second seats which are fastened together prior to installation of the front seat assembly in the vehicle. The front seat assembly is positioned in the vehicle as a single unit and then fastened to the vehicle. A method of installing a rear seat assembly is also disclosed. The rear seat assembly includes a seat back and a package tray pivotally attached to the seat back. Prior to installation, the package tray is positioned so that the rear seat assembly can be inserted through a door opening of the vehicle. The rear seat assembly is inserted through the door opening and the package tray is positioned to an extended position from the seat back and fastened to the vehicle. The seat back is also fastened to the vehicle.

9 Claims, 9 Drawing Sheets

U.S. PATENT DOCUMENTS

| | | |
|---|---|---|
| 4,127,301 | 11/1978 | Syrowik . |
| 4,198,091 | 4/1980 | Appleton . |
| 4,305,616 * | 12/1981 | Martinez . |
| 4,443,034 | 4/1984 | Beggs . |
| 4,479,675 | 10/1984 | Zankl . |
| 4,509,796 | 4/1985 | Takagi . |
| 4,524,762 | 6/1985 | Schulman . |
| 4,526,421 | 7/1985 | Brennan et al. . |
| 4,585,273 | 4/1986 | Higgs et al. . |
| 4,601,517 | 7/1986 | Heesch . |
| 4,602,817 * | 7/1986 | Raftery . |
| 4,681,367 | 7/1987 | Timmers . |
| 4,746,168 | 5/1988 | Bracesco . |
| 4,875,736 * | 10/1989 | Brambilla . |
| 4,881,702 * | 11/1989 | Slettebak . |
| 4,900,085 * | 2/1990 | Tobler . |
| 4,932,720 * | 6/1990 | Sherman . |
| 4,973,105 | 11/1990 | Itou . |
| 5,007,682 | 4/1991 | Kuwabara et al. . |
| 5,011,208 | 4/1991 | Lewallen . |
| 5,171,054 | 12/1992 | Wilson . |
| 5,286,084 | 2/1994 | Bart . |
| 5,288,122 | 2/1994 | Pilhall . |
| 5,301,914 | 4/1994 | Yoshida et al. . |
| 5,310,154 | 5/1994 | Ueda et al. . |
| 5,358,307 | 10/1994 | Shafer et al. . |
| 5,366,270 | 11/1994 | Heussner et al. . |
| 5,385,384 | 1/1995 | Gierman et al. . |
| 5,439,271 | 8/1995 | Ryan . |
| 5,443,239 | 8/1995 | Laporte . |
| 5,464,273 | 11/1995 | Makoto . |
| 5,468,050 | 11/1995 | Hall et al. . |
| 5,472,165 | 12/1995 | Gruber . |
| 5,485,976 * | 1/1996 | Creed et al. . |
| 5,492,361 | 2/1996 | Kim . |
| 5,509,722 * | 4/1996 | Beroth . |
| 5,529,376 | 6/1996 | Jovan et al. . |
| 5,547,259 * | 8/1996 | Fredrick . |
| 5,568,959 * | 10/1996 | Weber et al. . |
| 5,570,930 * | 11/1996 | LaPointe et al. . |
| 5,575,533 | 11/1996 | Glance . |
| 5,607,204 | 3/1997 | Gryp . |
| 5,609,395 * | 3/1997 | Burch . |
| 5,775,780 * | 7/1998 | Murphy et al. . |

* cited by examiner

MODULAR SEAT ASSEMBLY AND METHOD OF INSTALLING THE SAME WITHIN A VEHICLE

CROSS REFERENCE TO RELATED APPLICATIONS

This application is a Continuation-In-Part of U.S. patent application Ser. No. 08/705,512, filed Aug. 29, 1996, now U.S. Pat. No. 5,813,715, and U.S. patent application Ser. No. 08/705,513, filed Aug. 29, 1996, now U.S. Pat. No. 6,010,195, which both in turn claim priority to U.S. Provisional Patent Applications Serial Nos. 60/007,548, filed on Nov. 27, 1995, and 60/016,775, filed May 7, 1996.

BACKGROUND OF THE INVENTION

This invention relates in general to improved seat assemblies for use in a vehicle and a method of installing the seat assemblies. Typically, seats for use in automotive and truck vehicles vary in size, shape, and style for each particular vehicle platform. Also, a particular vehicle platform can have different styles of seats which can be installed in the vehicle. The front seats of a vehicle can have different seat configurations, such as for example, a "bench" seat in which the seat is a single structure which extends along the width of the front compartment of the vehicle. More common however, is a "bucket" seat arrangement in which separate driver and passenger seats are independently mounted on the floor in the front compartment of the vehicle. It is also common to include a center storage console positioned between the driver and passenger bucket seats and mounted on the floor.

Typically, each different style of seat is manufactured with a unique internal frame structure providing strength to the seat. The size and shape of the frame structure generally conforms to the size, shape, and style of the seat as well as the mounting locations within the vehicle front compartment. Since each seat is commonly manufactured with its own unique frame structure, the seats are generally not interchangeable between different vehicle platforms.

For a typical front bucket seat assembly, the driver seat, the console, and the passenger seat are separately positioned in the vehicle and mounted to the floor of the vehicle. To fasten the seats and console to the floor, a worker must enter the vehicle and fasten each mounting structure separately. Since the seats and console are mounted on the floor of the vehicle, it is difficult and time consuming to install all of the separate components. Also, the vehicle seats and console can include electrical components, such as motors, pumps, sensors, switches, and lights. These electrical components are electrically connected to various devices via wiring connectors or harnesses, commonly referred to in the industry as "pig-tails", extending from the floor of the vehicle. After the seats and console are fastened to the vehicle, the worker then must connect all of the corresponding electrical pig-tails together which are often located under the seats. In the field of human engineering or ergonomics, the installation of seats in a vehicle is a difficult and time consuming task.

BRIEF SUMMARY OF THE INVENTION

This invention relates in general to improved seat assemblies for use in multiple vehicle platforms and a method of installing the seat assemblies.

One of the inventive features includes the concept of installing a front seat assembly in a vehicle, wherein the seat assembly includes first and second seats which are fastened to one another prior to the installation in the vehicle. After the first and second seats have been fastened together, the seat assembly is positioned into the vehicle. The seat assembly can then be fastened to the vehicle as a single assembly, thereby reducing the effort and time required to install the seat assembly, as compared to installing separate individual seats. In a preferred embodiment, the seat assembly further includes a center console which is positioned between and fastened to the first and second seats prior to installation in the vehicle. The seat assembly can also be equipped with an electrical connector box mounted thereon which mates with a electrical connector box mounted on the vehicle. The electrical connector boxes provide for a single electrical junction box for electrical components used in the console and the first and second seats. In another preferred embodiment, the seat assembly can include seat or shoulder belt assemblies, wherein all belt end connections are fastened to the seat assembly, thereby eliminating the need to independently fasten the belts to structural members of the vehicle.

Another inventive feature is installing a rear seat assembly in a vehicle, wherein the seat assembly includes a seat back and a package tray pivotally mounted near the upper rear portion of the seat back. The package tray is first pivoted to a position so that the seat assembly can be inserted through a rear door opening of the vehicle. After the seat assembly is inserted in the vehicle, the package tray is extended outwardly from the seat back and fastened to the vehicle. The seat back is also fastened to the vehicle. The seat assembly can also be equipped with an electrical connector box mounted thereon which mates with an electrical connector box mounted on the vehicle. The electrical connector boxes provide for a single electrical junction box for electrical components used in the seat assembly. In another preferred embodiment, the seat assembly can include seat or shoulder belt assemblies, wherein all belt end connections are fastened to the seat assembly, thereby eliminating the need to independently fasten the belts to structural members of the vehicle. In another embodiment of the invention, the seat assembly can include a cross member fastened thereto, wherein the ends are fastened to the vehicle after the seat assembly is installed to provide for a rigid structural reinforcement member for the vehicle.

The front seat assembly can be configured as a modular seat arrangement, wherein a common seat back frame and common seat bottom pan can be used to accommodate a variety of vehicle platforms. A plurality of different styled seat back upholstery modules and corresponding seat bottom upholstery modules can be attached to the common seat back frame and common seat bottom pan.

Various objects and advantages of this invention will become apparent to those skilled in the art from the following detailed description of the preferred embodiment, when read in light of the accompanying drawings.

DETAILED DESCRIPTION OF THE INVENTION

Figure 1:
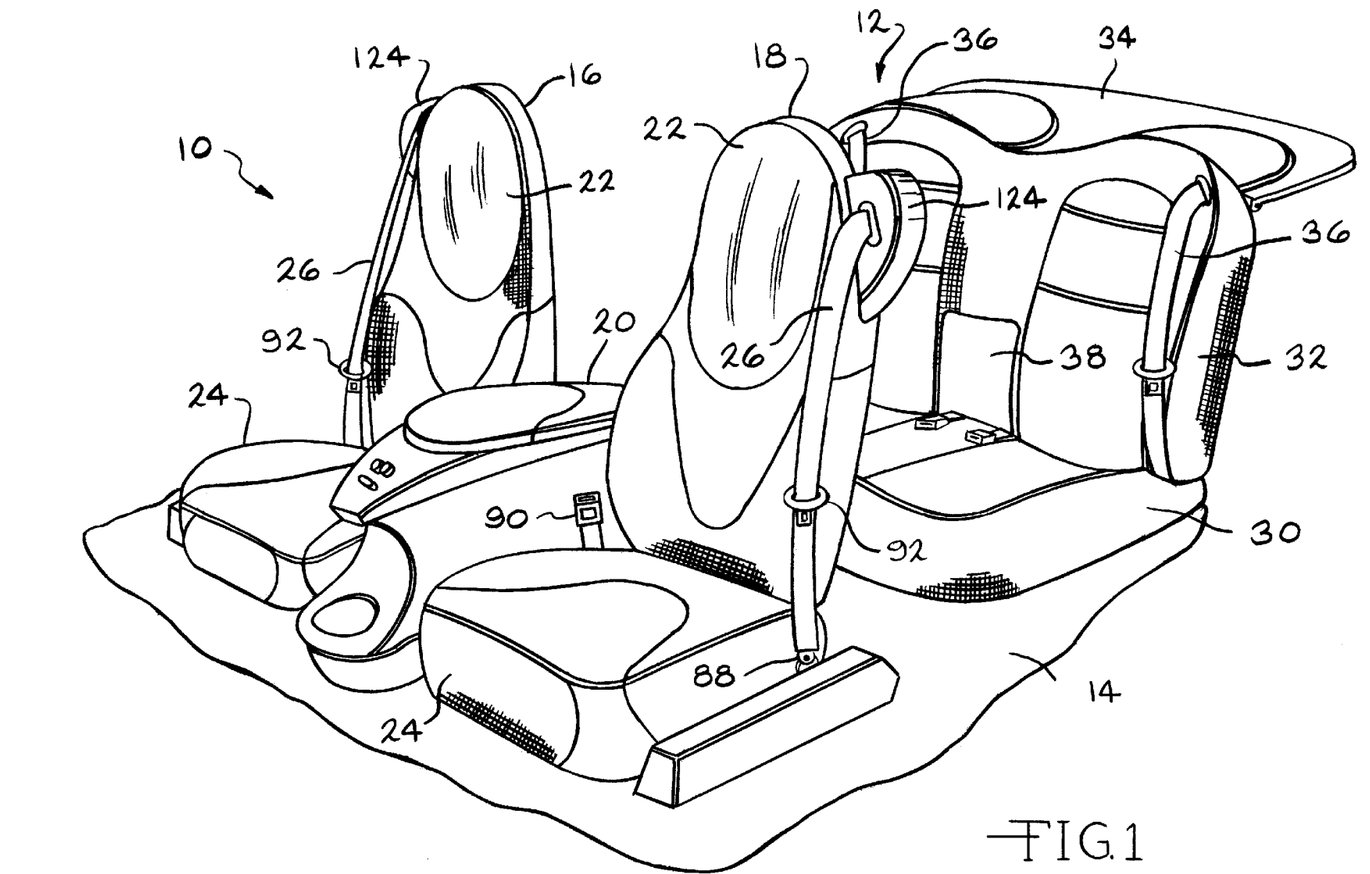
FIG. 1 is a perspective view of a front and rear seat assembly, in accordance with the present invention.

Referring now to the drawings, there is illustrated in FIG. 1 a front seat assembly, indicated generally at 10, and a rear seat assembly, indicated generally at 12, in accordance with the present invention. The front and rear seat assemblies 10 and 12 are fastened to a vehicle. As will be explained in detail below, the front and rear seat assemblies 10 and 12 include structures which are fastened together as a single unit which can then be quickly and easily installed into a vehicle. Also, as will be explained in detail below, the front seat assembly 10 is constructed so that different styles or modules of seat bottoms and seat backs can be interchangeability fastened to a common frame.

The front seat assembly 10 is a bucket style seat assembly and generally includes first and second seats 16 and 18. The front seat assembly 10 can also include a center storage console 20 positioned between the seats 16 and 18. The seats 16 and 18 are similar in structure to each other and include seat backs 22 and seat bottoms 24. As will be explained in detail below, the seats 16 and 18 also include shoulder belts 26 which are connected to various structures of the front seat assembly 10, as opposed to being fastened to structural members of the vehicle in which the front seat assembly 10 is installed.

The rear seat assembly 12 generally includes a seat back 32 and a deck or package tray 34. A seat bottom 30 is connected to a floor 14 of the vehicle. Preferably, the package tray 34 is pivotally attached to the seat back 32, such as described in co-pending U.S. patent application Ser. No. 08/705,512, which is assigned to the assignee hereof. The rear seat assembly 12 also includes seat or shoulder belts 36 which are connected to various structures of the rear seat assembly 12, as opposed to being fastened to structural members of the vehicle in which the rear seat assembly 12 is installed. Optionally, the rear seat assembly 12 can include an access panel 38 which is pivotally mounted on the rear seat assembly 12. The access panel 38 is shown in FIG. 1 in a closed position. In an open position, the access panel 38 exposes an opening leading to the trunk of the vehicle.

Figure 2:
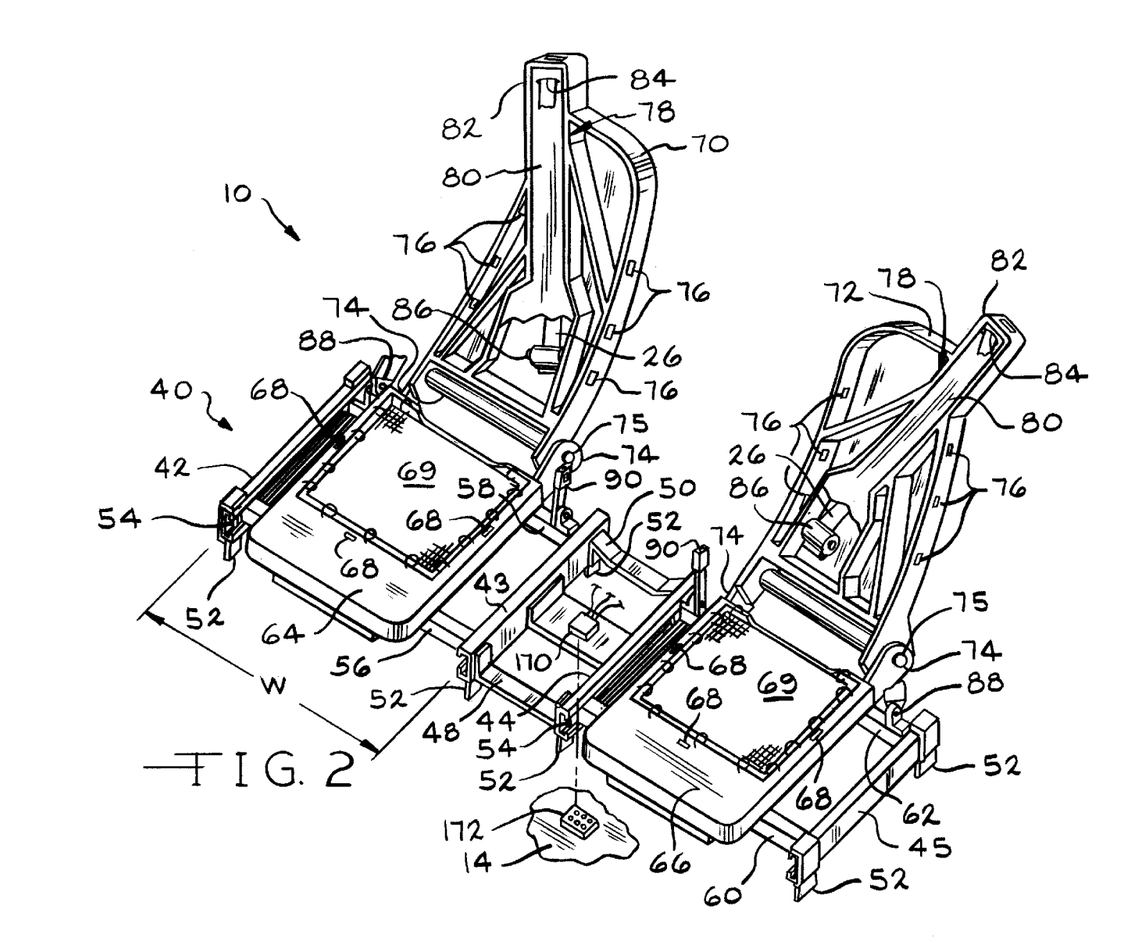
FIG. 2 is a perspective view of a frame assembly for the front seat assembly illustrated in FIG. 1.

Referring to FIGS. 1 and 2, the driver seat 16, passenger seat 18, and the console 20 are supported by a frame assembly, indicated generally at 40. The frame assembly 40 includes a first pair of rails 42 and 43, and a second pair of rails 44 and 45, respectively, which extend in a fore and aft (front and rear) direction with respect to the vehicle in which the front seat assembly 10 is installed. The rails 42, 43, 44, and 45 have a C-shaped cross-section defining a slot or opening 46 therein. The openings 46 of the rails 42 and 43 are oriented to face each other. The openings 46 of the rails 44 and 45 are oriented to face each other. The rails 43 and 44 are attached together by a pair of brackets 48 and 50. The brackets 48 and 50 can be attached by any suitable method, such as by welding or using fasteners. The brackets 48 and 50 can be formed into any desired shape, for example, in an upwardly extending arch-shape to fit over a tunnel (not shown) extending longitudinally along the floor 14 of the vehicle.

When the front seat assembly 10 is installed into a vehicle, the rails 42 and 45 and the brackets 48 and 50 are fixably attached to the vehicle. The rails 42 and 45 and the brackets 48 and 50 can be fixably attached to the vehicle by any suitable fastening means, such as for example, by using a plurality of brackets 52 having slots formed therein which latch onto hooks (not shown) extending from the vehicle. Alternatively, all the rails 42, 43, 44, and 45 can be fixably attached to the vehicle. Preferably, the brackets 52 attached to the outer rails 42 and 45 are fastened to the side sills (not shown) of the vehicle, while the brackets 52 attached to the inner rails 43 and 44 are fastened to a tunnel (not shown) generally extending longitudinally along the floor of the vehicle. When the brackets 52 are fastened to the sills and the tunnel, the space underneath the seats 16 and 18 can be used for storage.

The frame assembly 40 further includes slide rails 54 which are slidably disposed within each of the rails 42, 43, 44 and 45. If desired, the slide rails 54 can be supported in the rails 42, 43, 44, and 45 by roller bearings, ball bearings, or other suitable sliding structures. A front cross beam 56 and a rear cross beam 58 extend from and interconnect the slide rails 54 disposed in the rails 42 and 43. The cross beams 56 and 58 are movable with respect to the rails 42 and 43 in a fore and aft direction. Similarly, a front cross beam 60 and a rear cross beam 62 extend from and interconnect the slide rails 54 disposed in the rails 44 and 45. The cross beams 60 and 62 are movable with respect to the rails 44 and 45 in a fore and aft direction. The cross beams 56 and 58 support the first seat 16, while the cross beams 60 and 62 support the second seat 18. The length W of the cross beams 56, 58, 60, and 62, as shown in FIG. 2, can be changed to accommodate the different widths of the front compartments of various vehicle platforms.

The first and second seats 16 and 18 each include a rigid seat pan 64 and 66, respectively, fastened to the respective cross beams 56, 58, 60, and 62. The seat pans 64 and 66 can be attached to the respective cross beams 56, 58, 60, and 62 by any suitable fastening structures, such as that disclosed in co-pending U.S. patent application Ser. No. 08/705,513, which is assigned to the assignee hereof. For example, the seat pans 64 and 66 can include linkages (not shown) for raising and lowering the respective seats 16 and 18 with respect to the cross beams 56, 58, 60, and 62. The seat pans 64 and 66 have slots 68 formed therein, the reason for which will be explained below. Preferably, the seat pans 64 and 66 include a cushioning support 69 disposed in a recess 71 formed in the seat pans 64 and 66. Preferably, the cushioning support 69 is a flexible woven sheet suspended across the recess 71 by rings or hooks 73 fastened to the seat pans 64 and 66. The cushioning support 69 provides a relatively soft support for the occupants of the seats 16 and 18.

Each of the first and second seats 16 and 18 further includes a rigid seat back frame 70 and 72, respectively. The seat back frames 70 and 72 are similar in structure but have a mirror image shape with respect to each other for right and left orientations. The seat back frames 70 and 72 are pivotally attached to the respective seat pans 64 and 66 by flanges 74 extending outwardly from the seat pans 64 and 66 and cooperating pivot pins 75. Thus, the seat back frames 70 and 72 can be reclined relative to the seat pans 64 and 66. The seat back frames 70 and 72 can be any suitable shape, such as that disclosed in co-pending U.S. patent application Ser. No. 08/705,420, which is assigned to the assignee hereof. The seat back frames 70 and 72 have slots 76 formed therein, the reason for which will be explained below.

Both of the seat back frames 70 and 72 further include a shoulder belt housing, indicated generally at 78. The shoulder belt housing 78 defines a channel or coffin portion 80 for housing the shoulder belts 26 of the seats 16 and 18. The shoulder belt housings 78 have distal ends 82 which extend upwardly from the seat back frames 70 and 72. A belt opening 84 is formed through each of the distal ends 82 of the shoulder belt housings 78. Each seat 16 and 18 includes a belt retractor 86 fastened to the respective seat backs 70 and 72 for winding and unwinding the respective shoulder belt 26. Preferably, the unwound ends of the shoulder belts 26 are fastened to the respective rear cross beams 58 and 62. Note that in FIG. 2, the shoulder belts 26 are broken away for clarity. The shoulder belts 26 can be fastened to the cross beams 58 and 62 by any suitable structure, such as brackets 88. Preferably, shoulder belt buckles 90 are fastened to the rear cross beams 58 and 62 on the opposite sides of the respective seat pans 64 and 66 from the brackets 88. The buckles 90 receive movable tongues 92, as shown in FIG. 1, which are slidably disposed about the shoulder belts 26, thereby providing for a three point belt restraint.

Figure 3:
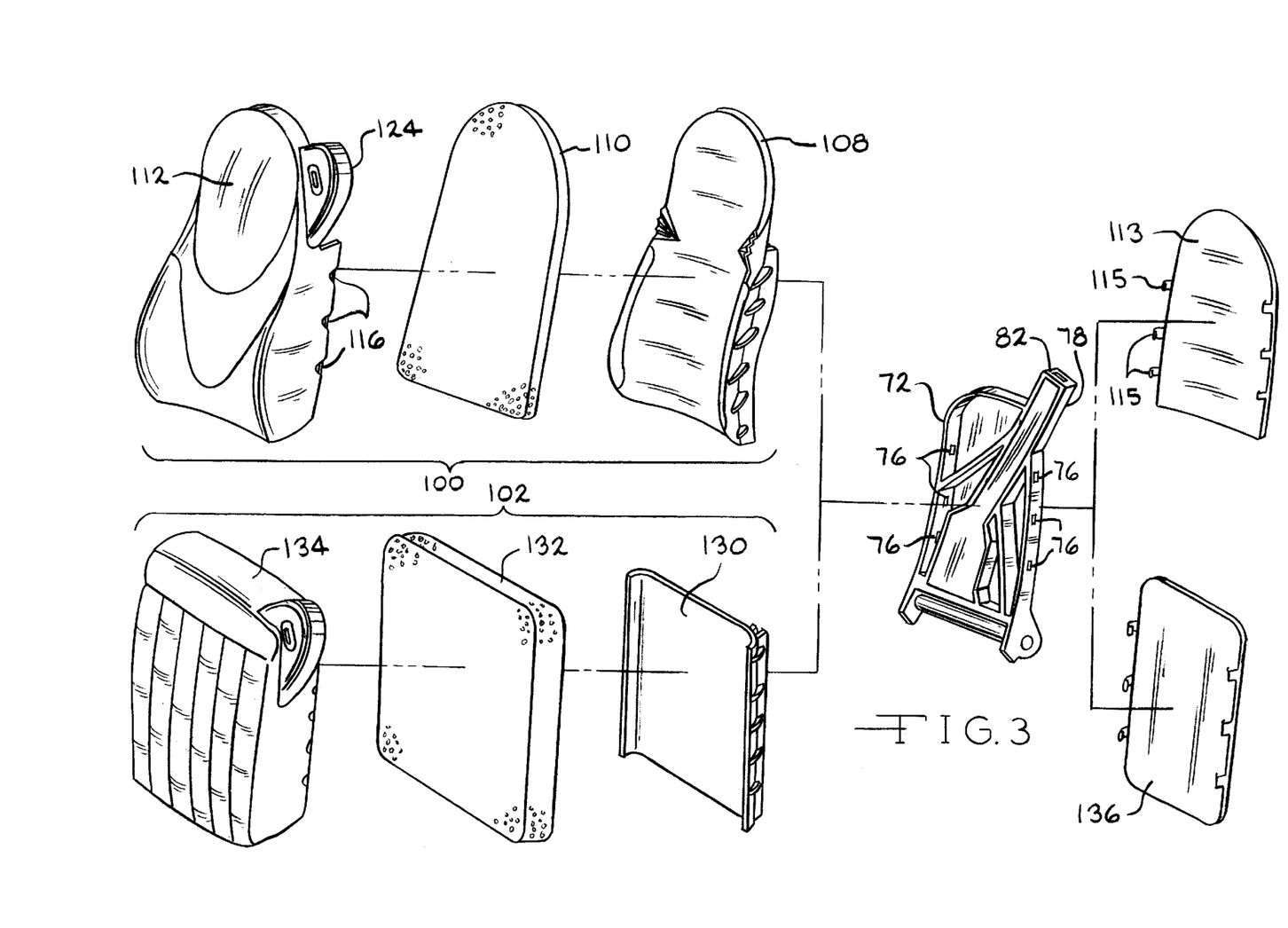
FIG. 3 is an exploded perspective view illustrating first and second style seat backs which can be used with the seat back frame illustrated in FIG. 2.
Figure 6:
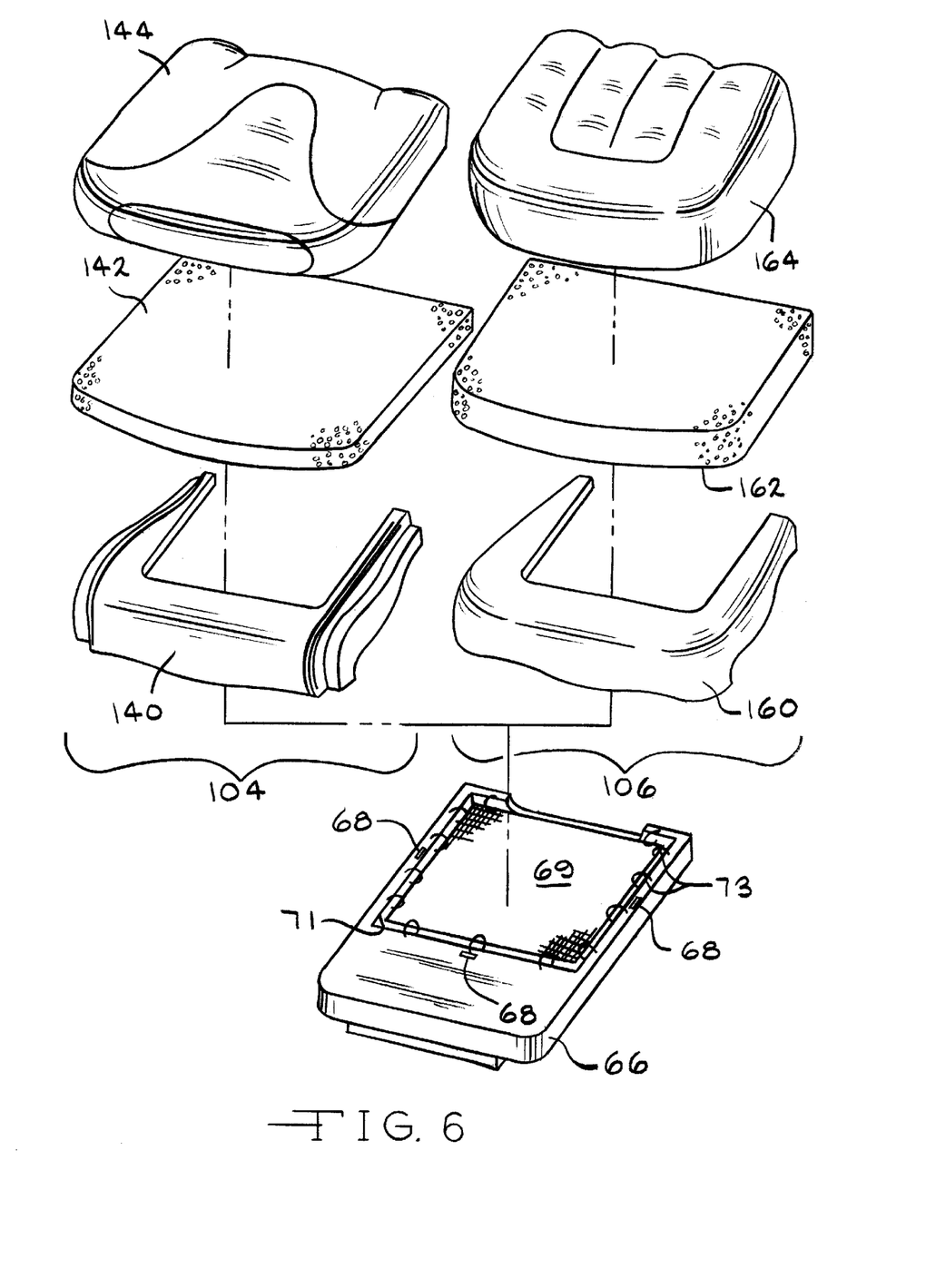
FIG. 6 is an exploded perspective view illustrating first and second style seat bottoms which can be used with the seat bottom pan illustrated in FIG. 2.

The seat backs 70 and 72, the seat pans 64 and 66, and the frame assembly 40 of the front seat assembly 10 provide a rigid backbone or framework upon which different upholstery modules are fastened to make a desired finished front seat assembly 10, such as that shown in FIG. 1. For example, as illustrated in FIG. 3, a first style seat back upholstery module 100 can be assembled and fastened to the seat back frame 72 to form the seat back 22 illustrated in FIG. 1. Alternatively, a second style seat back upholstery module 102 can be assembled and fastened to the seat back frame 72. Similarly, as illustrated in FIG. 6, a first style seat bottom upholstery module 104 can be assembled and fastened to the seat pan 66 to form the seat bottom 24 illustrated in FIG. 1. Alternatively, a second style seat bottom upholstery module 106 can be assembled and fastened to the seat pan 66. Thus, different styles of seats can be assembled using the same common seat back frame 70 or 72 and the same or common seat pan 64 or 66, thereby reducing manufacturing costs and providing flexibility in selection of seat arrangements. Due to the use of a common seat back frame 70 or 72 and a common seat pan 64 or 66, a large inventory of suitable upholstery modules can be manufactured for use in multiple vehicle platforms.

Figure 4:
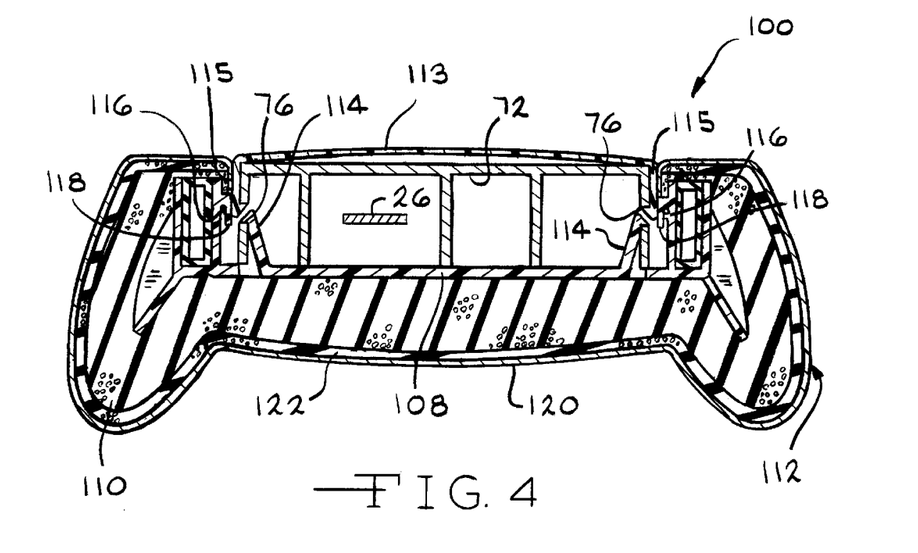
FIG. 4 is a sectional view of the first style seat back illustrated in FIG. 3.

Referring to FIGS. 3 and 4, the first style seat back upholstery module 100 generally includes a contoured support member 108, a pad 110, and a trim cover 112. Optionally, a back cover 113 can be fastened to the seat back frame 72 to cover the back surface thereof. The support member 108 can be any suitable structure for supporting the back of an occupant, such as that disclosed in co-pending U.S. patent application Ser. No. 08/705,513. The support member 108 can be fastened to the seat back frame 72 by any suitable method, such as by resilient tabs 114 formed in the support member 108 which cooperate with the slots 76 formed in the seat back frame 72. Note that the back cover 113 can similarly be fastened to the seat back frame 72 by resilient tabs 115 formed in the back cover 113 which cooperate with the slots 76 formed in the seat back frame 72. The pad 110 and the trim cover 112 is positioned over the support member 108 so that the pad 110 is sandwiched between the trim cover 112 and the support member 108. The pad 110 conforms to the shape of the support member 108 when the trim cover 112 is installed over the support member 108. Preferably, the pad 110 has a constant thickness and the support member 108 is shaped to accommodate the desired contour of the seat back. The trim cover 112 can be fastened to the support member 108 by any suitable means, such as by loops 116 attached to the trim cover 112 which cooperate with hooks 118 formed on the support member 108. The loops 116 can be formed by a rod disposed at the periphery of the trim cover 112. Preferably, the trim cover 112 includes an outer upholstered layer 120 and a flexible foam layer 122. The foam layer 122 helps reduce the formation of wrinkles in the upholstered layer 120. The trim cover may also include a scrim layer (not shown) disposed between the pad 110 and the foam layer 122. The first style seat back upholstery module 100 can also include a cap 124 to cover the distal end 82 of the shoulder belt housing 78.

Figure 5:
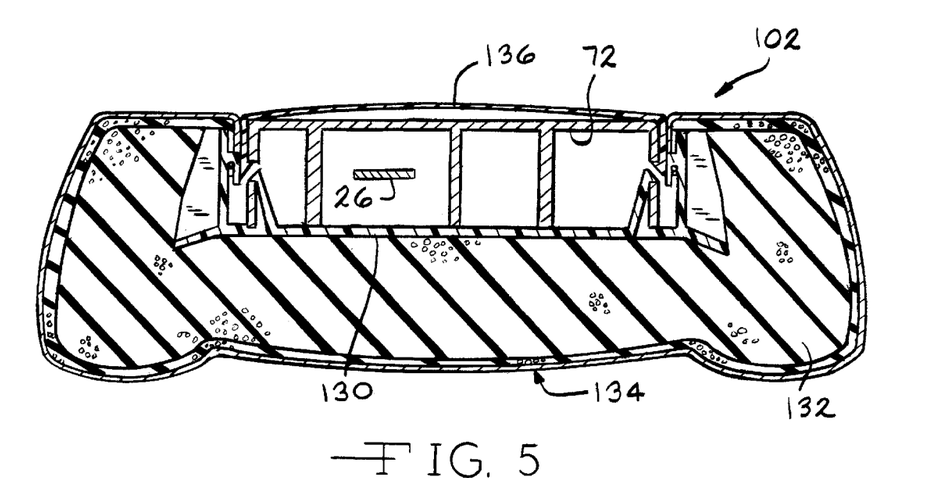
FIG. 5 is a sectional view of the second style seat back illustrated in FIG. 3.

The second style seat back upholstery module 102, as shown in FIGS. 3 and 5, is similar in structure to the first style seat back upholstery module 100 with the exception of its overall shape. The second style seat back upholstery module 102 generally includes a contoured support member 130, a pad 132, and a trim cover 134. Optionally, a back cover 136 can be fastened to the seat back frame 72 to cover the back surface thereof. The second style seat back upholstery module 102 can be assembled and fastened to the seat back frame 72 in a similar manner as described with respect to the first style seat back upholstery module 100. Although FIGS. 3 through 5 illustrate specific first and second style seat back upholstery modules 100 and 102, it should be understood that any suitable style seat back upholstery module can be used with the seat back frame 72.

Figure 7:
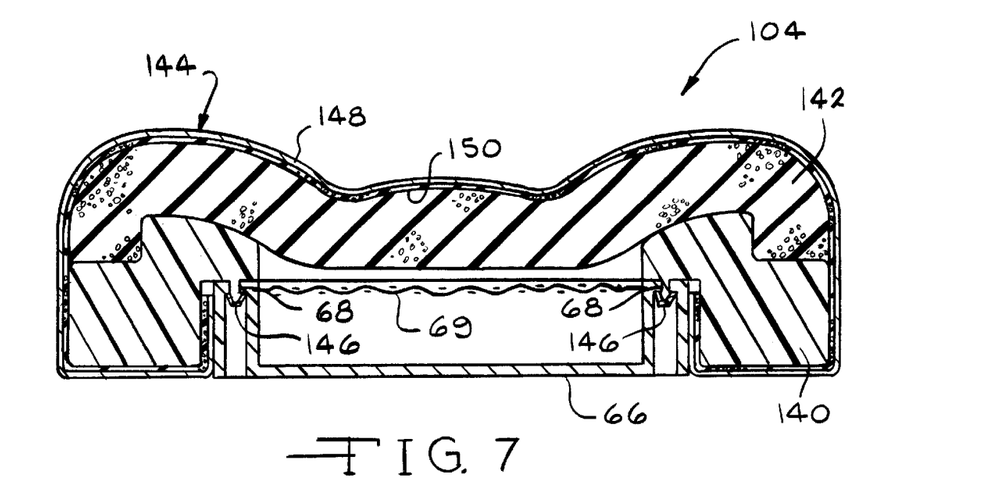
FIG. 7 is a sectional view of the first style seat bottom illustrated in FIG. 6.

Referring to FIGS. 6 and 7, the first style seat bottom upholstery module 104 generally includes a contoured support member 140, a pad 142, and a trim cover 144. The support member 140 can be any suitable structure for supporting the occupant. The support member 140 can be fastened to the seat pan 66 by any suitable method, such as by fasteners 146 formed in the support member 140 which cooperate with the slots 68 formed in the seat pan 66. The pad 142 and the trim cover 144 is positioned over the support member 140 so that the pad 142 is sandwiched between the trim cover 144 and the support member 140. The pad 142 conforms to the shape of the support member 140 when the trim cover 144 is installed over the support member 140. The trim cover 144 can be fastened to the support member 140 by any suitable means. Preferably, the trim cover 144 includes an outer upholstered layer 148 and a flexible foam layer 150. The trim cover 144 may also include a scrim layer (not shown) disposed between the pad 142 and the foam layer 150.

Figure 8:
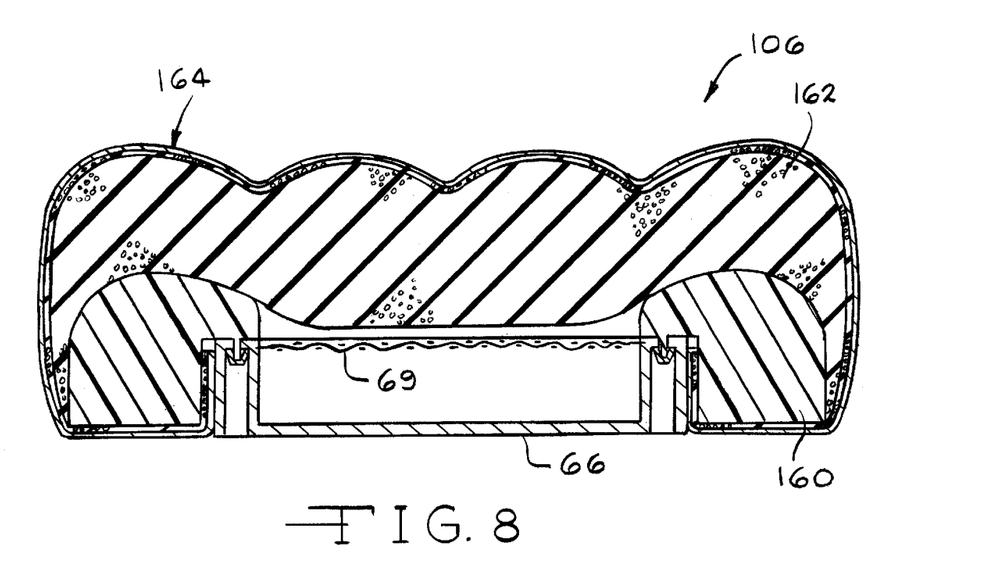
FIG. 8 is a sectional view of the second style seat bottom illustrated in FIG. 6.

The second style seat bottom upholstery module 106, as shown in FIGS. 6 and 8, is similar in structure to the first style seat bottom upholstery module 104 with the exception of its overall shape. The second style seat bottom upholstery module 106 generally includes a contoured support member 160, a pad 162, and a trim cover 164. The second style seat bottom upholstery module 106 can be assembled and fastened to the seat pan 66 in a similar manner as described with respect to the first style seat bottom upholstery module 106. Although FIGS. 6 through 8 illustrate specific first and second style seat bottom upholstery modules 104 and 106, it should be understood that any suitable style seat bottom upholstery module can be used with the seat pan 66.

Figure 9:
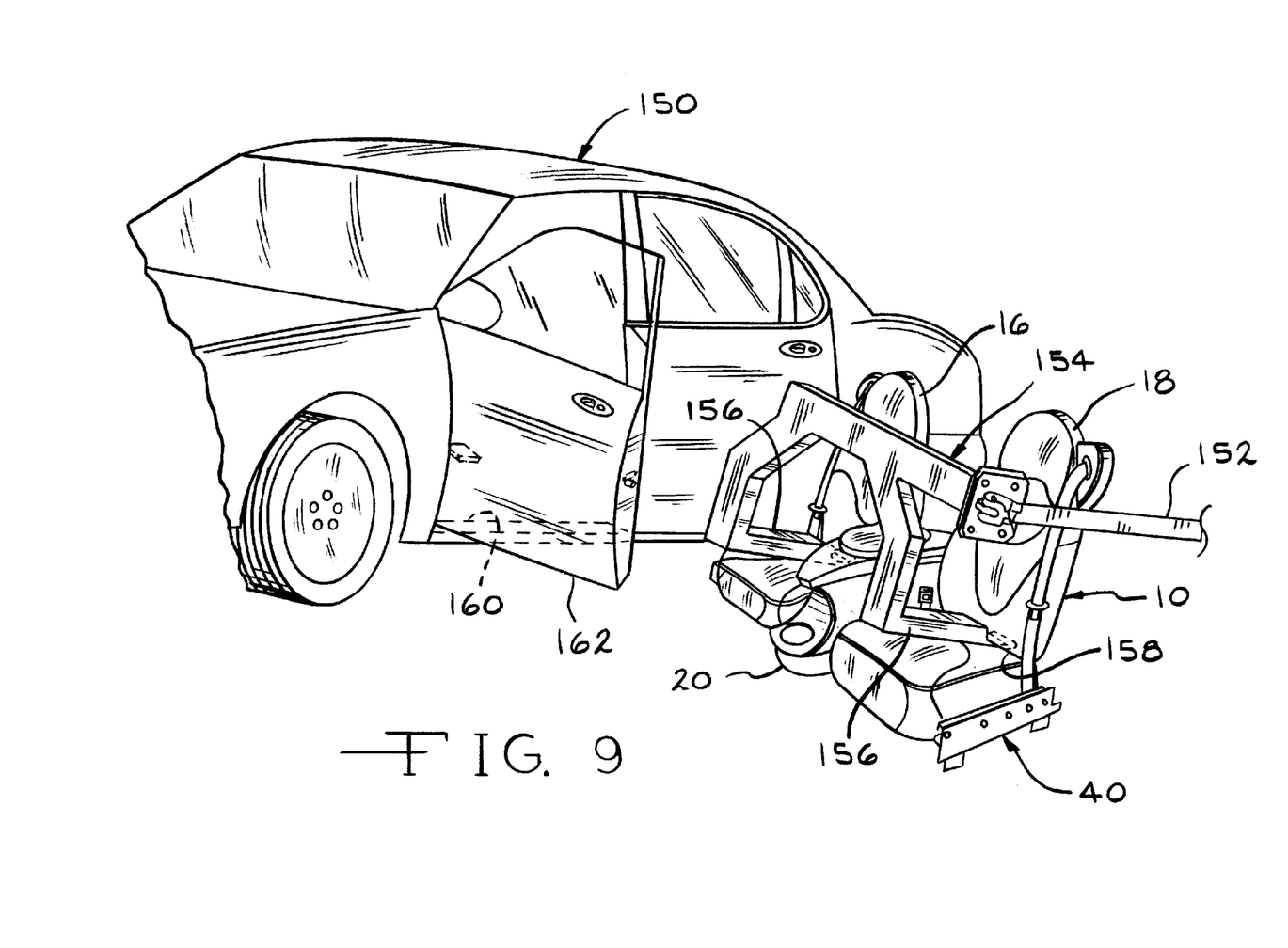
FIG. 9 is a perspective view illustrating the installation of the front seat assembly of FIG. 1 in a vehicle, in accordance with the present invention.

As described above, the frame assembly 40, the first and second seats 16 and 18, and the console 20 can be fastened together as a single assembly to form the front seat assembly 10. The front seat assembly 10 can then be installed into a vehicle together as a single unit, instead of fastening the first seat 16, the console 20, and the second seat 18 separately. As shown in FIG. 9, the front seat assembly 10 can be installed in a vehicle 150 with the assistance of a robotic arm 152 of an industrial automated machine (not shown). To install the front seat assembly 10, the robotic arm 152 first lifts the front seat assembly 10 by any suitable method, such as with the aid of a lifting fixture 154. The lifting fixture 154 includes a pair of forks 156 which are inserted into bight lines 158 defined between the seat back 22 and the seat bottom thereof. The pair of forks 156 support the weight of the seats 16 and 18 and assist in reducing bending of the frame assembly 40 as the front seat assembly 10 is lifted. Of course, the front seat assembly 10 can be lifted at any suitable location and by any suitable lifting fixture. The front seat assembly 10 can also be lifted and positioned manually or with the assistance of a manual assist arm.

After the front seat assembly 10 is lifted, the robotic arm 152 is operated to position the front seat assembly 10 within the vehicle 150 through a door opening 160 of the vehicle. If necessary, the robotic arm 152 can rotate the seat assembly 10 to any required orientation to allow the seat assembly 10 to fit through the door opening 160. After the front seat assembly 10 has been properly positioned within the vehicle, the frame assembly 40 can then be fastened to the vehicle 150. The frame assembly 40 can be fastened by any suitable manner, such as by fastening the brackets 52, as illustrated in FIG. 2, to cooperating structures in the vehicle. Since all of the connections of the shoulder belts 26 are located on the front seat assembly 10, there is no need to individually fasten the shoulder belts 26 to the vehicle 150.

Preferably, the front seat assembly 10 further includes a first electrical connector box 170 mounted thereon, as shown in FIG. 2, which electrically mates with a second electrical connector box 172 mounted on the vehicle 150 when the front seat assembly is installed. The first electrical connector box 170 is electrically connected to various electrical components (not shown) mounted in the front seat assembly 10, such as for example, seat adjustment mechanisms, motors, pumps, sensors, heaters, switches, and lights. The second electrical connector box 172 is electrically connected to the associated electrical components and power supplies for the electrical components mounted in the front seat assembly 10. Thus, the first and second electrical connector boxes 170 and 172 provide for simple and quick electrical connections without having to individually connect the wiring, such as by conventional wiring harnesses or "pig-tails". The first and second electrical connector boxes 170 and 172 can have any suitable structure, such as that described in co-pending U.S. patent application Ser. No. 08/705,424.

Figure 10:
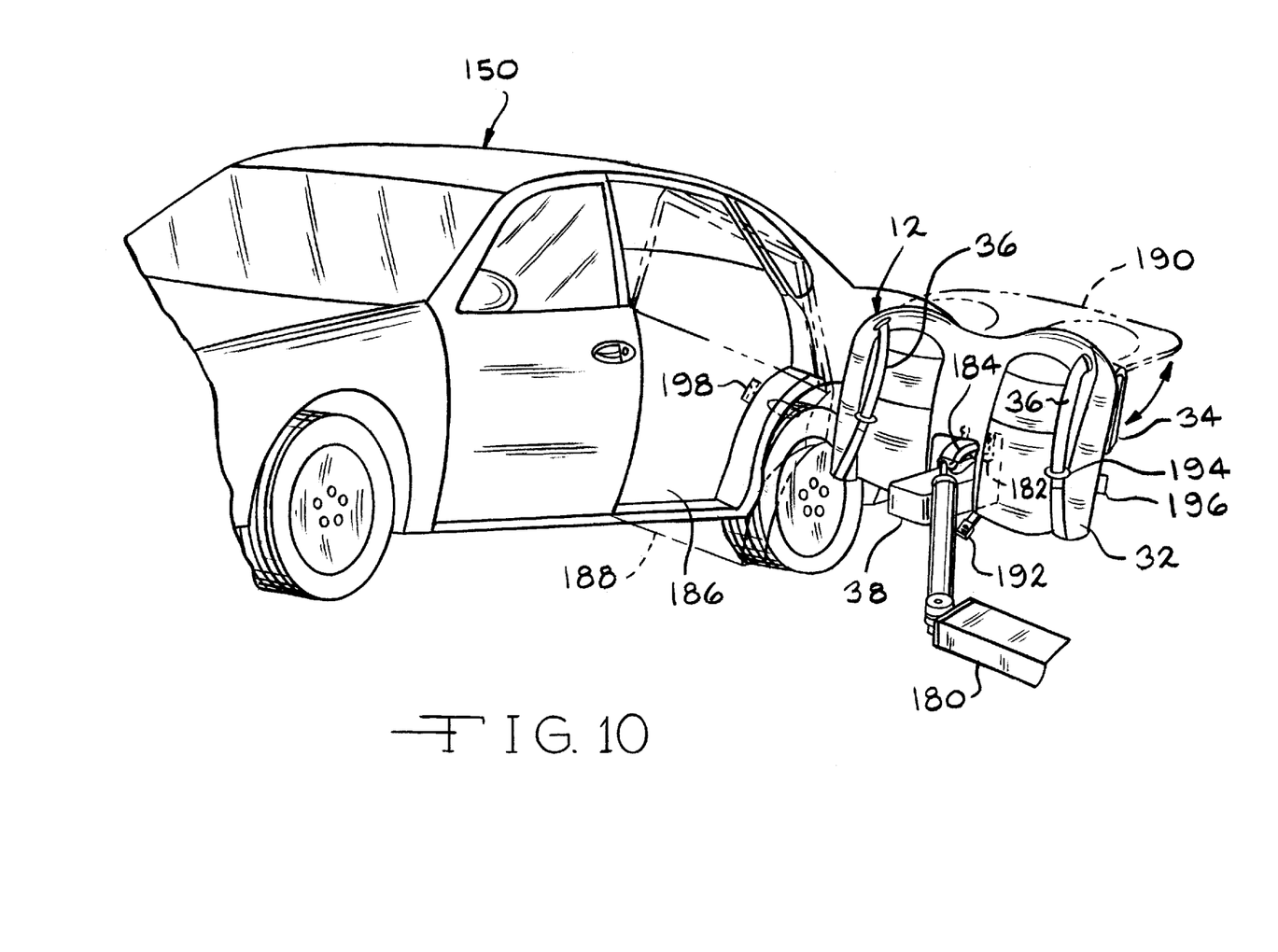
FIG. 10 is a perspective view illustrating the installation of the rear seat assembly of FIG. 1 in a vehicle, in accordance with the present invention.

The rear seat assembly 12 can also be installed into the vehicle 150 as a single unit, as illustrated in FIG. 10. Similarly to the installation of the front seat assembly, a robotic arm 180 of an industrial automated machine may be used to lift the rear seat assembly 12. The robotic arm 180 can lift the rear seat assembly 12 by any suitable manner, such as for example, by grasping a flange 182 mounted on the rear seat assembly 12 adjacent the opening of the access panel 38 with jaws 184, as illustrated in FIG. 10. The package tray 34 is positioned so that the rear seat assembly 12 can fit through a door opening 186. For example, the package tray 34 is positioned substantially flush against the rear seat back 32, such as that shown in solid lines in FIG. 10, to enable the rear seat assembly 12 to be inserted through the door opening 186. Note that a door 188 is shown in phantom lines for clarity. The robotic arm 180 is then operated to position the rear seat assembly 12 within the vehicle 150. After the rear seat assembly 12 has been properly positioned within the vehicle 150, the rear seat assembly 12 is then fastened to the vehicle 150 by any suitable manner. Also, the package tray 34 is pivoted upward to a position represented by the phantom lines 190 in FIG. 10, and fastened to the vehicle 150 in any suitable manner. For example, the package tray 34 could slide into grooved structures (not shown) formed along the sides of the vehicle 150. Preferably, the rear seat assembly 12 includes shoulder belt buckles 192 for receiving movable tongues 194 slidably disposed about the shoulder belts 36. Preferably, the shoulder belt buckles 192 and the rear seat assembly 12 are fastened together so that the shoulder belt buckles 192 and the rear seat assembly 12 do not have to be separately fastened to the vehicle.

The rear seat assembly 12 may also include a first electrical connector box 196 mounted thereon which mates with a second electrical connector box 198, similar to the first and second electrical boxes 170 and 172 of the front seat assembly 10. The first and second electrical boxes 196 and 198 can be used, for example, to electrically connect lights, switches, center high-mount stop lamp, wire harness for rear defogger, and speaker wires for speakers mounted on the package tray 34. The first and second electrical connector boxes 196 and 198 can be mounted at any suitable position, such as that shown in FIG. 10.

Figure 11:
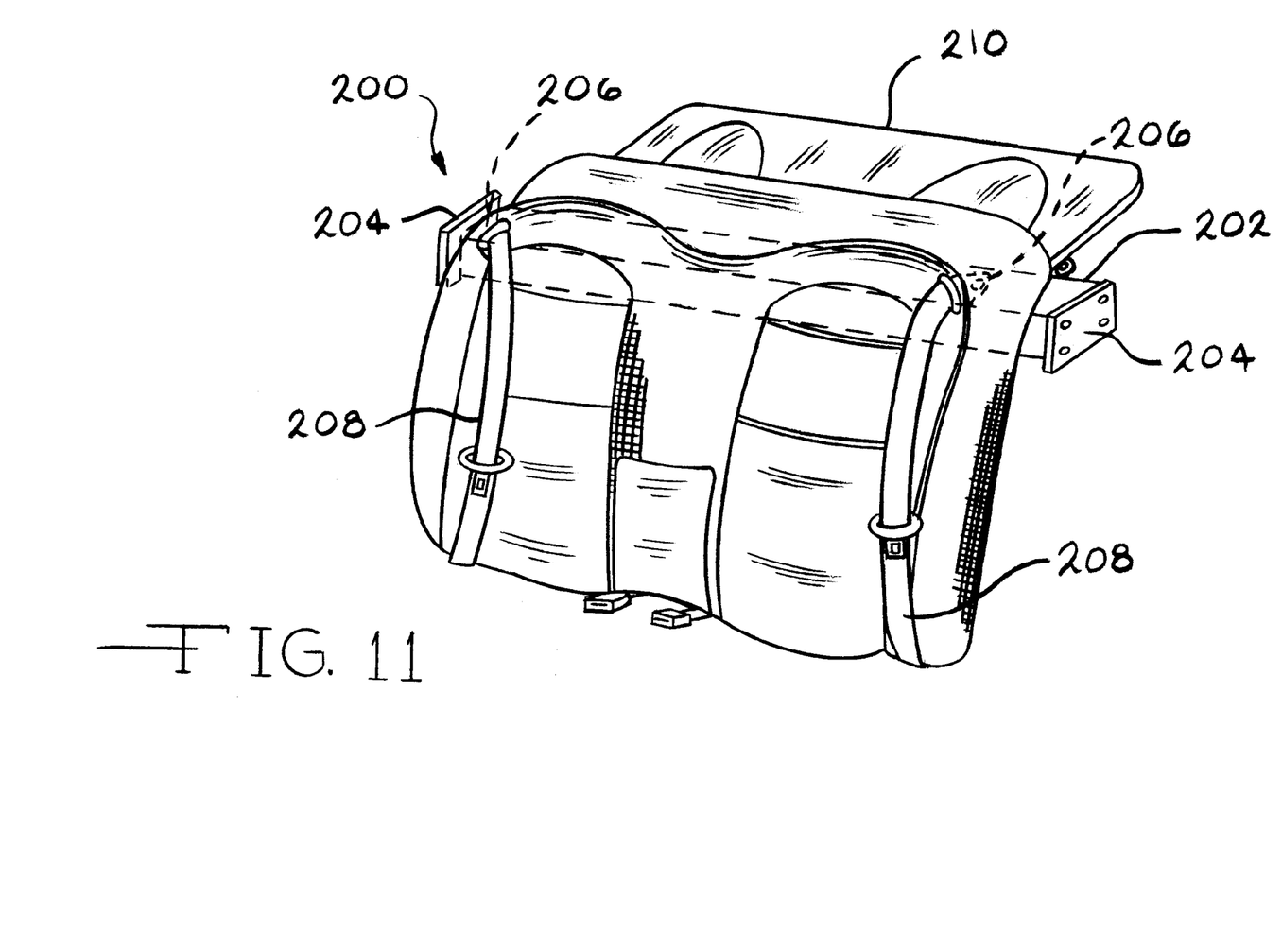
FIG. 11 is a sectional view of an alternate embodiment of a rear seat assembly having an integral structural cross member.

There is illustrated in FIG. 11 an alternate embodiment of a rear seat assembly 200. The rear seat assembly 200 includes a substantially rigid cross member 202 extending along the width of the rear seat assembly 200 at the rear end thereof. The cross member 202 provides torsional rigidity for the vehicle in which the rear seat assembly 200 is installed. After the rear seat assembly 200 is installed in a similar manner as described above with respect to the rear seat assembly 12, ends 204 of the cross member 202 are fastened to the vehicle, such as by suitable fasteners (not shown). Since the cross member 202 is a rigid structural member, the cross member 202 can provide for anchoring points for ends 206 of shoulder belts 208 which are attached to the cross member prior to installation of the rear seat assembly 200 in the vehicle. The rear seat assembly 200 can also include a pivotally attached package tray 210.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of assembling a vehicle seat for installation in a selected one of a plurality of different vehicle platforms, the method comprising the steps of:

a. providing a seat frame having a mounting assembly for fastening the seat frame to a variety of different vehicle platforms, wherein the seat frame has a common design with a predetermined width for all of the different vehicle platforms;

b. providing a plurality of different rigid support members, each of the rigid support members having side portions defining a width which is greater than the predetermined width of the frame such that the side portions of the rigid support members function to generally define the side contour of the seat;

c. providing a plurality of different pads;

d. providing a plurality of different trim covers;

e. attaching selected ones of the plurality of support members, pads, and trim covers together to form an upholstery module; and f. attaching the upholstery module to the seat frame, thereby assembling a vehicle seat.

2. The method of claim 1 further including the step of fastening the mounting assembly of the seat frame to a vehicle, thereby installing the vehicle seat into a vehicle.

3. The method of claim 1, wherein the seat frame includes a bottom pan and a back frame, and wherein an upholstery module is formed and attached to each of the seat frame and bottom pan.

4. The method of claim 1, wherein the seat frame includes a back frame, the method further comprising the step of attaching a back cover to the seat frame.

5. The method of claim 1, wherein the plurality of different support members have fastening members which mate with corresponding fastening members formed on the seat frame for attaching the upholstery module to the seat frame.

6. The method of claim 5, wherein the fastening members of the support members include resilient tabs, and wherein the fastening members of the seat frame define a plurality of slots formed in the seat frame for receiving the tabs to attach the upholstery module to the seat frame.

7. The method of claim 1 further including the step of attaching ends of a restraining belt to the seat frame.

8. The method of claim 7, wherein one of the ends of the seat belt is disposed in a retractor fastened to a seat back of the seat frame, and wherein the other end of the seat belt is fastened to the mounting assembly of the seat frame.

9. The method of claim 8, wherein the trim cover is formed of an outer upholstered layer and a flexible foam layer.

* * * * *